H. G. DAVIS.
WELDING APPARATUS.
APPLICATION FILED FEB. 19, 1914.

1,233,452.

Patented July 17, 1917.
7 SHEETS—SHEET 2.

Witnesses:
K. E. Hartwell.
Caroline N. Willis

Inventor.
Henderson G. Davis.
By Chapin & Co.
Attorney.

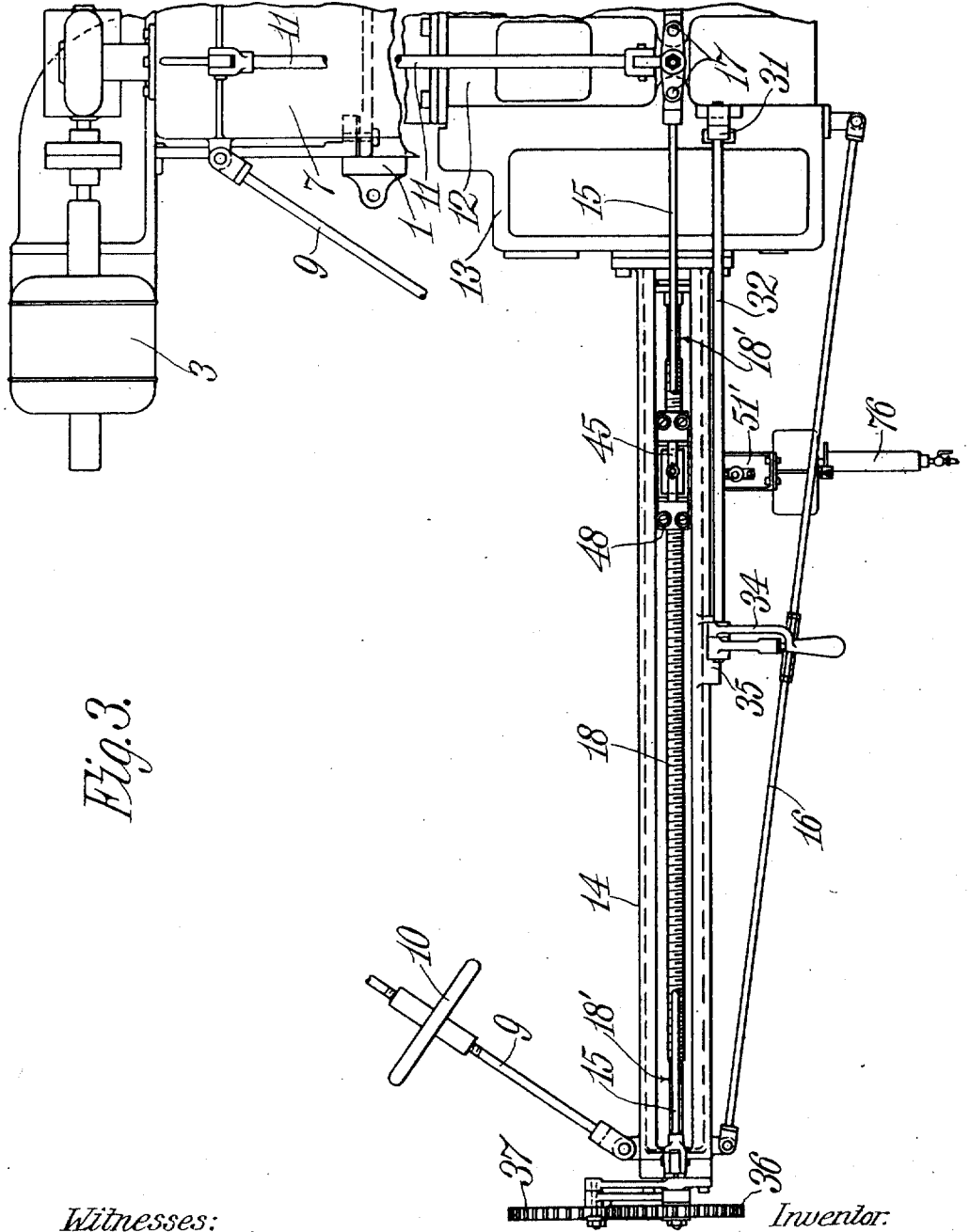

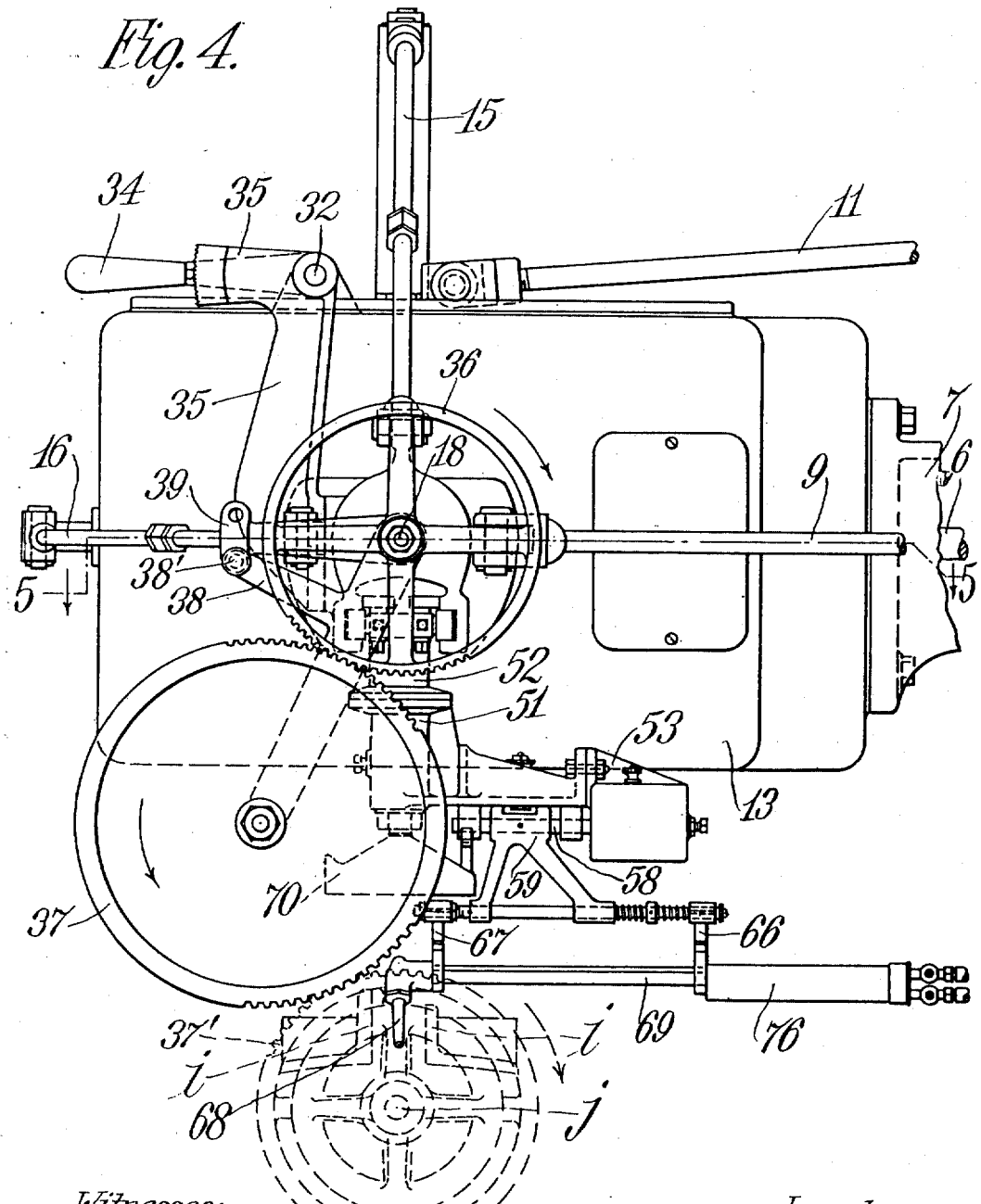

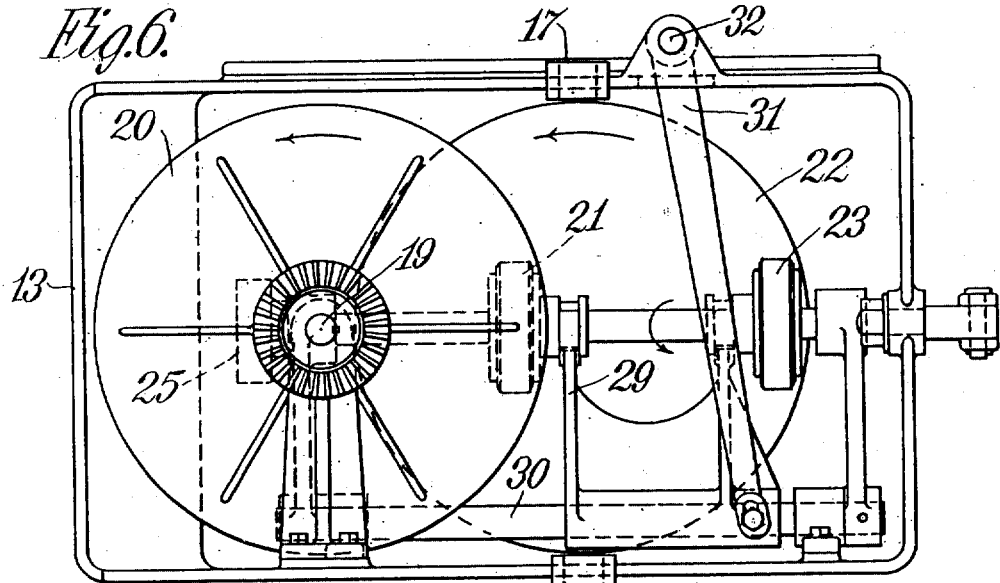
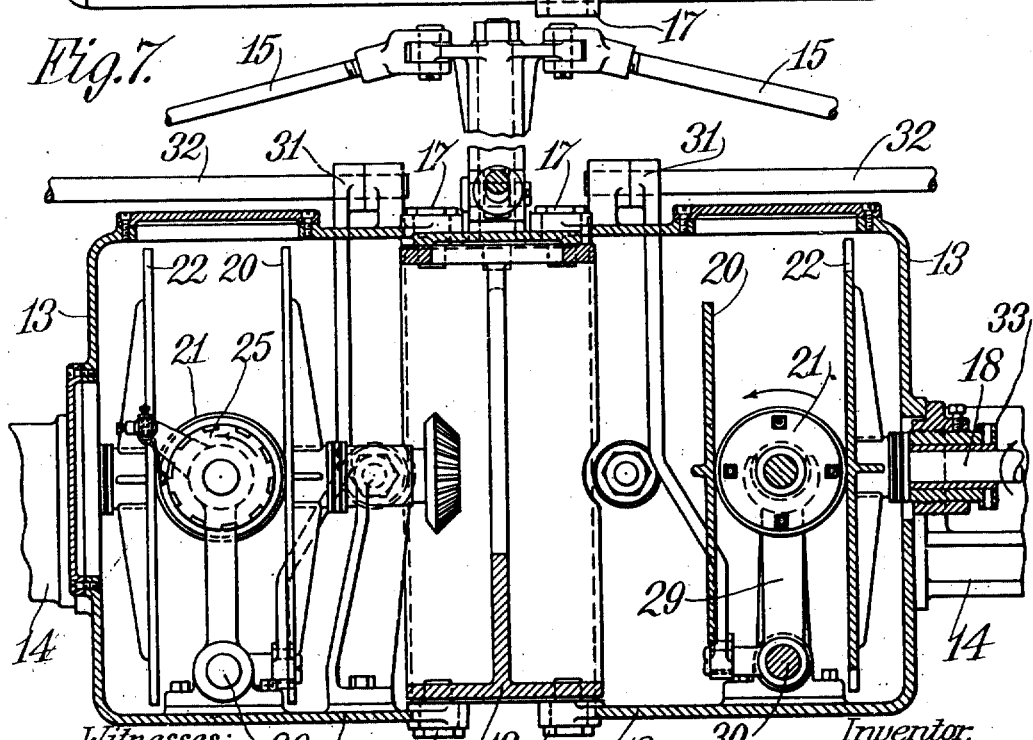

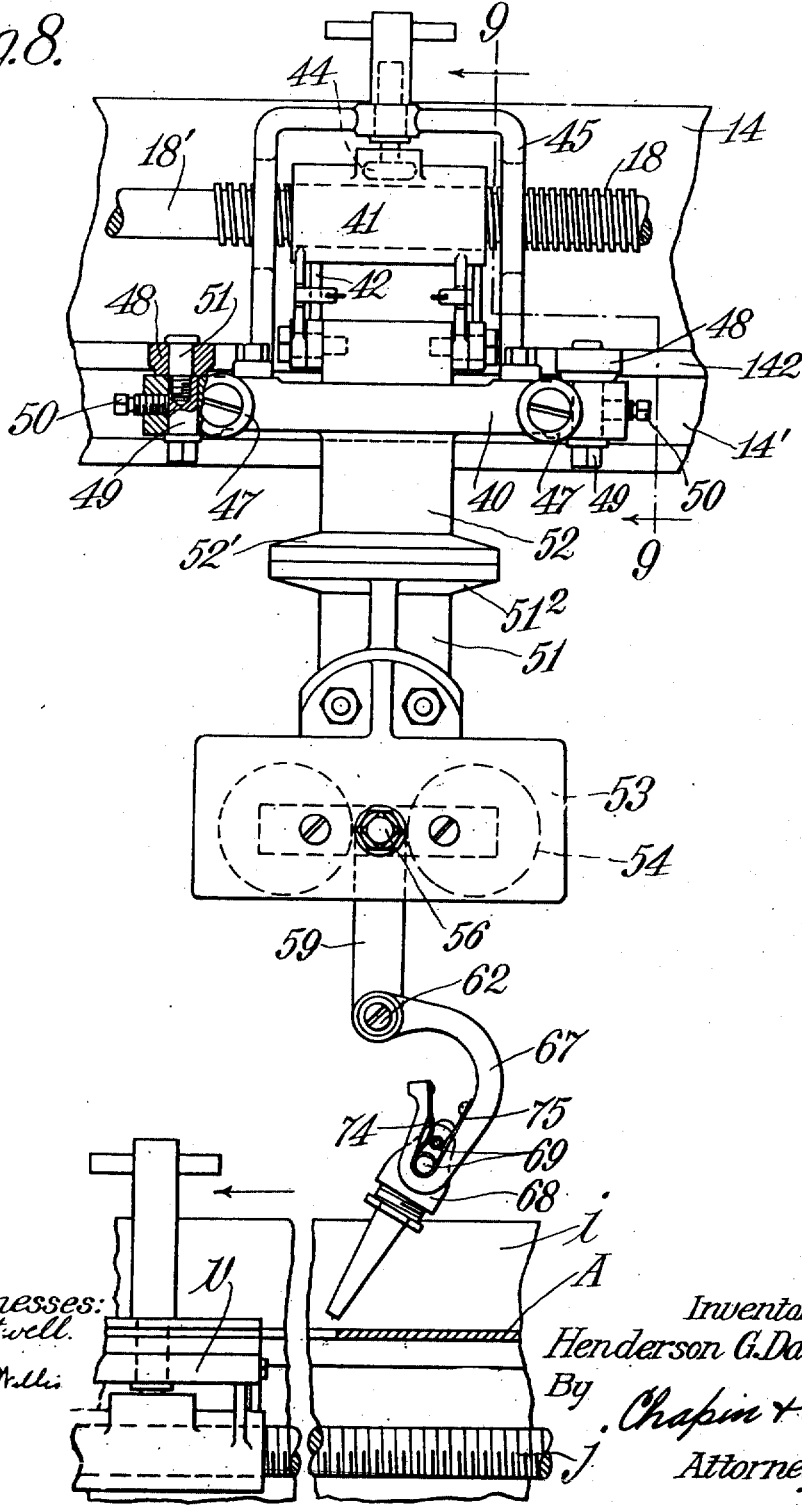

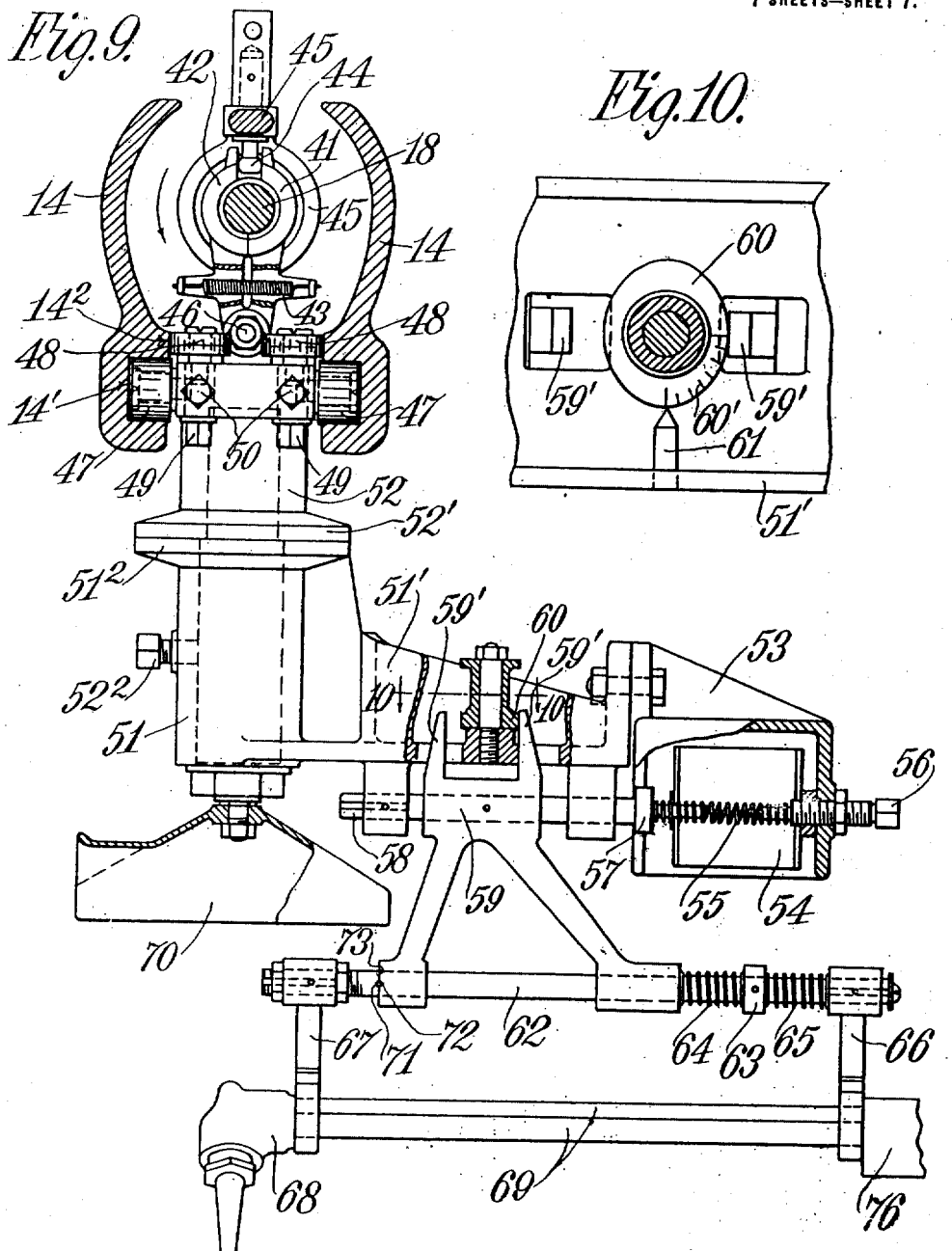

UNITED STATES PATENT OFFICE.

HENDERSON G. DAVIS, OF CONSHOHOCKEN, PENNSYLVANIA, ASSIGNOR TO GILBERT & BARKER MANUFACTURING COMPANY, OF WEST SPRINGFIELD, MASSACHUSETTS, A CORPORATION OF MASSACHUSETTS.

WELDING APPARATUS.

1,233,452.   Specification of Letters Patent.   Patented July 17, 1917.

Application filed February 19, 1914. Serial No. 819,668.

*To all whom it may concern:*

Be it known that I, HENDERSON G. DAVIS, a citizen of the United States, residing in Conshohocken, in the county of Montgomery, State of Pennsylvania, have invented certain new and useful Improvements in Welding Apparatus, of which the following is a specification.

This invention relates to welding apparatus. More specifically it relates to automatic means for suspending and moving a torch or other heating means in close proximity and along a seam to be welded.

An object of the invention is to provide automatic means for moving a welding torch along and transversely across a seam to be welded. Another object of the invention is to produce a machine which will dispense with the skilled labor, heretofore necessarily employed in autogenous welding operations. To this end, further objects are to provide a traveling torch, movable longitudinally along the seam to be welded and vibratory transversely across said seam, approximating the motions made by hand. Another object of the invention is to provide a device of the class mentioned which will be adjustable for various thicknesses of metal to be welded. Another object is to provide a machine which will coöperate with a machine similar to that disclosed in my co-pending application, Serial No. 764,530 which is a device for clamping and distancing metal to be welded. Other objects of the invention will appear in the detailed description and annexed claims.

With these objects in view, the apparatus shown here for the purpose of illustrating my invention, in general, comprises a supporting pedestal, bearing the driving means and an overhanging or cantaliver arm through which the drive is communicated to a central box-like member. To this box-like member are fastened at right angles to the afore-mentioned cantaliver arm, and on opposite sides thereof, two long frame-like members which form ways for the travel of the welding torch carriage and a support for the feed screw. Located within the central box-like structure are the variable speed devices for transmitting power from the main drive shaft to the two feed screws as well as commutators for making and breaking an electric circuit with various degrees of rapidity. The torch is supported on a carriage which is freely movable by the feed screw on the aforementioned ways and is so mounted that rapid vibratory movements of varying amplitude may be imparted thereto by an electro-magnet connected with the aforementioned make and break device and operating in conjunction with a spring. Further details of structure possessing advantages will appear as the description proceeds.

In the accompanying drawings which illustrate a preferred form of my invention:

Fig. 2 is a side elevational view on a similar scale with certain parts broken away to reveal the driving mechanism.

Fig. 3 is a fragmentary plan view on a larger scale, illustrating clearly the feed screw and torch supporting carriage.

Fig. 4 is a partial side elevational view on a large scale showing clearly the manner of supporting the traveling torch in the ways of the machine.

Fig. 5 is a cross sectional view taken on the line 5—5 of Fig. 4, and illustrates the variable speed driving connections.

Fig. 6 is a cross sectional view taken on the line 6—6 of Fig. 5, showing clearly the variable speed driving devices.

Fig. 7 is a cross sectional view taken on the line 7—7 of Fig. 5 showing also parts of my said co-pending application.

Fig. 8 is a front elevational view of the torch and its supporting carriage, showing clearly the method of mounting same in its ways and the method of application of the torch to work held by a clamping machine similar to that disclosed in my co-pending application, Serial No. 764,530.

Fig. 9 is a cross sectional view taken on the line 9—9 of Fig. 8 with certain parts broken away to reveal novel features. This figure clearly illustrates the manner of mounting the torch on its supporting carriage and the various adjustments thereof, and Fig. 10 is a sectional view taken on the line 10—10 of Fig. 9 and illustrates the manner of varying the amplitude of the torch vibrations.

Figure 1:
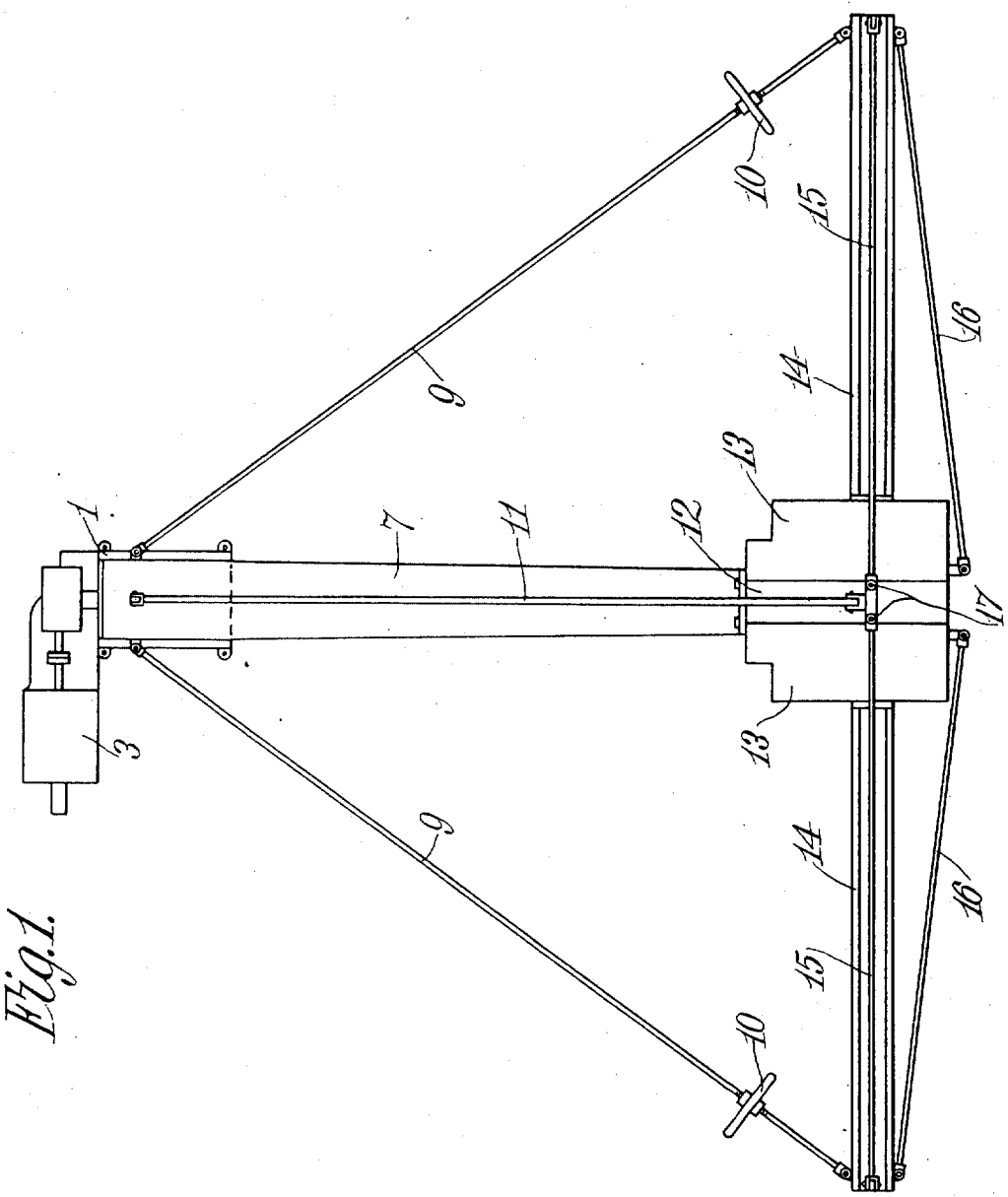
Figure 1 is a plan view on a reduced scale, showing the general shape of the machine.

Referring to Figs. 1 and 2 which show the general shape and structure of the machine: 1 is a hollow box-like pedestal secured to the floor. Movable in this pedestal and vertically adjustable therein by the bevel gear arrangement shown is the member 2 which supports a hollow overhanging or cantaliver arm. Member 2 also supports by means of a bracket a motor 3 which supplies power for the operation of the machine. The motor 3 drives by means of a worm 4 and a worm wheel 5, a shaft 6 which passes through the cantaliver arm 7 to the central supporting frame portion 12. The member 12 is bolted directly to the overhanging arm 7 and supports by pivots at 17 two hollow box-like structures 13. Within each box-like member 13 is located the variable speed driving connections and a commutator for making and breaking with various degrees of rapidity an electrical circuit and attached to these members 13 arranged at right angles to the arm 7, are hollow frames or ways 14 which support the feed screws and the movable torch supporting carriages. Members 14 are vertically braced by tie rods 15 to the central member 12. They are also braced in a horizontal direction to members 13 by tie rods 16. On the opposite side to rods 16 are braces 9 which tie the ways 14 to the pedestal member 2. These braces are adjustable for length by means of a right and left hand thread and a hand wheel 10, thus making it possible to swing the ways 14 and members 13 on the pivots 17 a slight distance one way or the other to line up the travel of the torch with the seam to be welded.

The work to be welded is supported and clamped in position by a separate machine. This machine is described in my co-pending application, Serial No. 764,530, and has four radial arms, supported rotatably from a central pedestal each adapted to support the work to be welded. A lead screw on each of these arms carries a wedge which distances and maintains the edges of the metal to be welded in the proper position. The central supporting pedestal of this machine is located directly below the central box-like structures 13 described, and the radial arms carrying the work to be welded are adapted to swing in under the ways 14 so that the lead screw $j$ of the companion machine above identified may be driven from the lead screw 18 through the gear 38 (mounted on the end of lead screw 18), gear 37 and gear 37'. The latter as indicated in Fig. 4 is mounted on the end of the lead screw $j$ of the companion machine. In this arrangement the drive differs from that shown in the co-pending case. The difference in the drive of lead screw $j$ is, however, believed to be clear from an examination of Fig. 4. The change involved in the machine described in the aforesaid co-pending case requires a gear corresponding to gear 37' on the end of each lead screw $j$ of that machine. With this change the two machines will work together harmoniously as shown in Fig. 8, the traveling wedge $v$ of the companion machine (which is designed to properly distance the edges to be seamed), is by the driving connections described necessarily driven in proper time relation to the travel of the torch. Hence, the peculiar shape of this machine with its ways 14 supported on the long overhanging arm 7, is to allow the clamping machine above mentioned to be disposed thereinunder and to allow room for the radial arms thereon to turn.

Having now described the general shape and character of my machine I will proceed with a detailed description thereof and will first describe the mechanism located within the box-like members 13. Figs. 5, 6, and 7, which are sectional views as described, clearly illustrate this mechanism. In this connection, it will be noted that Fig. 5 is a partial or fragmentary view, only one of the members 13 being completely shown. However, the mechanism which might be shown at the right hand side of Fig. 5 is the exact duplicate of that shown and is symmetrically disposed thereto. These figures also show the method of supporting members 13 on pivots. Each member 13 is a hollow box open at the pivot end and pivotally connected at 17 to the central frame 12, the outside dimensions of the latter being slightly less than the inside dimensions of members 13 (see Fig. 7).

The shaft 6, (see Fig. 2), passing through the overhanging arm 7 enters the central frame portion 12 and is rotatably mounted therein. The shaft 6 drives by means of bevel gears two stub shafts 19 which are rotatably mounted in bearings secured to members 13. Keyed to each stub shaft 19 is a circular driving disk 20 (see Fig. 5) and keyed to each lead screw 18 is a similar disk 22. The lead screw 18 and the shaft 19 are parallel and are spaced apart a distance approximately one half of the diameter of disks 20 and 22. At right angles to the lead screw 18 and shaft 19 and mounted centrally between the disks 20 and 22 is a shaft 24 rotatably mounted in bearings which are pivoted to the member 13 for reasons to be stated later. A friction wheel 21, is loosely mounted on shaft 24 and transmits power from disk 20 directly to the disk 22 so that the latter is driven in the direction of the arrow and in the same direction as disk 20. To provide an adjustment for wear on the friction wheel 21, I have applied a nut 33, loosely fitting the lead screw 18 and threaded into the member 14. Nut 33 can be tightened against a ball bearing thrust collar and force disk 22 toward disk 20 to take up the wear. It is obvious that in so doing the shaft 24 must also move to bring wheel 21 against disk 20 and for this reason it has been mounted in bearings which are pivotally supported on member 13, as described and clearly shown in Fig. 7. It is to be noted, that the transmission described, drives the two lead screws 18 in opposite directions as indicated by the arrows.

A second friction wheel 23 is mounted on the shaft 24 slidable on a feather key and bearing against the disk 22 on the opposite side to the friction wheel 21. Power from the disk 22 is transmitted to the friction wheel 23 which rotates the shaft 24. On the opposite end of shaft 24 and keyed thereto is a commutator 25 which consists of an insulated disk with segments on the periphery thereof. Mounted in and insulated from a brush holder are a pair of brushes which rest on the commutator 25. One brush rests on a continuous metallic ring on the commutator and the other rests on a portion which is alternately insulation and metallic segments, the latter being extensions of the aforementioned ring. This construction is clearly shown in Figs. 5 and 7. Electrical energy is supplied at 26 to two circuits 27 and 28 in each of which a commutator 25, one for each shaft 24, is interposed. These circuits 27 and 28 supply energy to electro-magnets to be described. As the shaft 24 turns the current in these circuits is made and broken in a well known manner by the commutator 25.

Referring now more particularly to Fig. 6, it will be seen that the friction wheels 21 and 23 are each provided with yoke collars. A member 29, slidably mounted on a rod 30 near the bottom of member 13, has two arms which engage each of the collars before mentioned in the usual manner. The member 29 is connected by a lever 31 to a shaft 32. The shaft 32 is rotatably supported in bearings on the member 13 and on a bracket 35 attached to the ways 14 (see Figs. 3 and 4). Fixed to the shaft 32 and near the bracket 35 is a lever 34, provided with a spring pressed pin which engages notches in member 35 and adjustably positions lever 34 in the usual way. Thus by moving lever 34, the clutch member 29 will be moved and with it the friction wheels 21 and 23, thus varying the speed. It is to be noted particularly that with this construction any change in speed of the lead screw 18 will be accompanied by a similar change in the speed of the commutator. It is to be understood that the mechanism described in the singular as associated with one of the box-like members 13 and its lead screw 18 has its duplicate associated with the other box-like member 13 and its lead screw as indicated in the drawings.

I will now describe the means for driving the lead screw on the work clamping machine. The members 14, previously mentioned have the cross sectional shape shown in Fig. 9. Each end, however, is closed and in these end portions the lead screw 18 is journaled (see Fig. 3). The inner end is provided with a flange which is bolted directly to the box-like structure 13. At the outer end a projecting bracket 39 is mounted which is provided with two holes. The lead screw 18 projects through the outer end of member 14 (see Fig. 4) and carries a loosely mounted lever 38 and a gear 36, the latter being keyed thereon. Lever 38 has an outwardly extending arm provided with a pin 38' which is adapted to slip into either one of the holes in the bracket 39. Rotatably mounted in the lever 38 is an intermediate gear 37 adapted to engage a gear 37' on the lead screw of the clamping machine as shown in dotted lines in Fig. 4. In the work clamping machine the radial work supporting arms are adapted to be turned and it is thus desirable to provide for disconnecting the driving means for the lead screw of that machine. This is accomplished by pulling out pin 38' from the lower hole in 39, lifting lever 38, thereby rolling the intermediate gear 37 on its driving gear 36 and lifting the former out of mesh with the gear on the lead screw of the work clamping machine. Then the radial arm on the clamping machine can be turned, a second arm supporting work to be welded can be positioned under the lead screw 18, and the intermediate gear 37 again dropped into mesh with the gear on the lead screw in the second arm.

I will now describe the torch carrying carriage together with the manner of mounting it on the lead screw and in the ways of members 14. Figs. 8 and 9 best illustrate this construction. 40 represents the base portion of the carriage and mounted on stud bolts in the sides thereof are rolls 47 which are adapted to roll in a recessed runway 14' in the member 14. At each corner of the carriage 40 and on the upper sides thereof are mounted rolls 48 which bear against the surface $14^2$ of the member 14. These rolls are adjustably mounted and act as positioning devices whereby the carriage may be shifted transversely of the member 14 a slight amount one way or the other. This adjustment is obtained by mounting the roll 48 on a stud bolt 51 which is threaded into a tapped hole in the pin 49. This hole in the pin 49 is eccentrically disposed so that as the pin 49 is turned the roll 48 may be thrown away or toward the center line of the member 14 a small amount. When the carriage has been properly positioned in the member 14 the pins 49 are locked in position by turning up the set screw 50. Pivoted to a lug in the center and on the top of the carriage 40 are two pairs of upwardly extending arms, each pair carrying the half nut members 41 and 42 which are adapted to engage the lead screw. Each arm on 41 is connected to each arm on 42 by an extensible coil spring 43 which tends to keep the half nuts 41 and 42 in engagement with the lead screw 18. The spring 43 is clearly shown in Fig. 9 where the nearest arm on 41 and 42 is broken away to reveal it. Also mounted on the top of carriage 40 is a bracket 45 having two vertical arms which surround but do not engage the lead screw 18 and which are joined by a horizontal bridge portion.

In the center of the bridge portion of member 45 is mounted a twister 44 which consists of an elliptical shaped piece mounted on the lower end of a vertical spindle the latter being provided with a handle at the top. The elliptical shaped piece of the twister 44 fits into a recess between the half nuts 41 and 42 and in the upper portion thereof. When the twister 44 is turned so that the major axis of the elliptical piece thereon is parallel to the axis of the lead screw 18 as shown in Fig. 9, the threads in the half nuts 41 and 42 engage the threads on the lead screw 18 and the carriage 40 will be propelled along the ways 14 when screw 18 is turned. When, however, 44 is so turned that the minor axis of the elliptical piece is parallel to the axis of the lead screw 18 the half nuts 41 and 42 are spread apart sufficiently so that they no longer engage the lead screw 18 and the carriage 40 is no longer propelled thereby.

I will now describe the manner of mounting the torch and the means for producing the desired transverse vibrations thereof. The description of the mechanism for one supporting arm and its torch will serve for both. Referring more particularly to Figs. 8 and 9, 52 is a depending portion of the carriage 40 which is provided with a flange 52' thereon. A cylindrical member 51 bearing an outwardly extending bracket 51' and provided with a flange 51² is clamped to the depending member 52 by a stud bolt 52². The flanges 51² and 52' are designed to receive the thrust of the apparatus mounted on the bracket portion 51' to be described. The bracket 51' supports at its outermost end a second bracket 53 which forms a casing as well as a supporting means for the vibrating mechanism. Within this casing and secured thereto is a bipolar electro-magnet 54 which is connected to the electrical circuit 27 previously described. The electrical circuit 28 connects with a corresponding magnet for the companion torch on the other supporting arm. Mounted in lugs depending from the bracket 51' is a rod 58 which bears at one end an armature 57, the latter being arranged in line with the pole pieces of the electro-magnet 54 and adapted to be attracted thereby when the electro-magnet 54 is energized by an electric current. Located between the two coils of the electro-magnet 54 is a coil spring 55 which is adapted to maintain the armature 57 away from the pole pieces of the electro-magnet 54 and is adjustable by the set screw 56. The electro-magnet 54 and the coil spring 55 thus constitute a vibrating mechanism and when current is applied intermittently to the electro-magnet 54, the rod 58 will be rapidly vibrated back and forth. The rod 58 is pin keyed into one of the depending lugs of the bracket 51' and is therefore slidable but not rotatable therein.

A torch supporting member 59 is pinned to rod 58 and is provided with two projections 59' which extend upwardly through holes in the base of the bracket 51' as shown in Figs. 9 and 10. Between these projections 59' and in the path thereof is an elliptical shaped piece 60 hereinafter called an adjustable stop. This stop 60 is mounted on a stud bolt in the bracket 51' and clamped thereto by a nut on top of the stud bolt. The stop 60 gages the amplitude of the vibrations of the rod 58 in an obvious manner and by loosening the afore-mentioned nut on top of the stud bolt it may be turned thereon and the amount of vibration adjusted. I have provided the stop 60 with graduations 60' (see Fig. 10) on the upper surface thereof which in conjunction with the pointer 61, mounted in the bracket 51' furnish a means for quickly and conveniently setting the stop 60 to produce any desired amplitude of vibration.

Returning to the supporting member 59, previously mentioned. This member supports by two depending arms, a rod 62 which is loosely mounted therein. A pin 71 in the rod 62 engages a notch 72 in one of the depending arms of member 59. A spring 64 also on the rod 62 acts against a collar 63 to force the pin 71 in the notch 72. The collar 63 is pinned to the rod 62 and on the opposite side of collar 63 to spring 64 is a second spring 65, which bears against the hub of arm 66 extending downwardly from rod 62. The arm 66 is pin-keyed to rod 62 and therefore, slidable but not rotatable thereon. At the other extremity of rod 62 as shown in Figs. 8 and 9 is a second arm 67 exactly similar to arm 66 and like it also pin-keyed to the rod 62. This arm 67 is locked in position on the rod 62 by two clamping nuts so that it is adjustably secured thereon and is neither slidable nor rotatable with respect to rod 62. The lower portion of arms 66 and 67 are hooked-shaped, as clearly shown in Fig. 8, and are adapted to receive the supply pipes 69 of the welding torch 68. These pipes 69 are snapped in place in the hook portions of arms 66 and 67 between two flat springs 74 and 75 which yieldingly hold them therein and prevent vibration of the pipes 69 with relation to the arms 66 and 67. The torch 68 is simply a conventional representation of the usual torch used in autogenous welding and needs no further description. The arm 67 bears against the torch 68 and the arm 66 bears against the member 76 which is simply a housing for the pipes 69.

Referring to Fig. 9, when the member 59 is moved by the electro-magnet, it moves rod 62 slightly to the right, the force being transmitted through spring 64. It is to be understood that the latter is not appreciably compressed by this action and serves only to transmit the movement of member 59 to the collar 63. The latter compresses spring 65 and forces arm 66 also to the right. The arm 66 acts on member 76 and carries the torch 68 to the right a slight amount. When the current is interrupted the spring 55 forces the armature back to the position shown in Fig. 9 and member 59 moves the rod 62 to the left by means of the pin 71.

The manner in which the torch 68 is applied to the clamping machine is clearly shown in Fig. 8 where A represents the material to be welded, $j$ the feed screw which carries the traveling distancing wedge and $i$ the clamping device. During the welding operation the nozzle of the torch 68 lies between the upwardly extending flanges of the members $i$. When, however, one of the radial arms on the clamping machine has to be turned it is necessary to remove the torch 68 from the path of the clamping member $i$. Therefore, I provide a second notch 73 in one of the arms on member 59 and above the previously described notch 72. I then swing the arm 67 upwardly and thereby turn the rod 62 until the pin 71 snaps into the notch 73, which holds the torch out of the path of member $i$ of the clamping machine.

The heat from the torch in rising strikes a hood 70 and is deflected outwardly instead of passing upwardly to the mechanism.

The machine described is specifically designed to coöperate with the machine described in my co-pending application, Serial No. 764,530, but I would have it distinctly understood that I do not limit myself to this specific use. As previously mentioned the clamping machine supports and clamps the material A which is to be welded, and it also maintains the two edges of the material A a proper distance apart for welding by a wedge which travels on the feed screw $j$. Two arms of the four supporting arms on the clamping machine, bearing material to be welded are positioned in under the two arms 14 and the feed screws $j$ are connected to and driven from the lead screws 18 by the intermediate gears 37 as has been previously described. The carriages 40 are moved in ways 14' to a position adjacent to the box-like structures 13 and the half nuts 41 and 42 are placed in engagement with the lead screw 18. The welding torches 68 are then lowered to the position shown in Fig. 8, as previously described. The motor 3 is then started and the torches are moved longitudinally along the seams in the material A, one piece of work underlying each torch. At the same time the electro-magnets 54, being intermittently energized from an electrical supply circuit 26 by the commutators 25, vibrate the torches 68 transversely across the seams and the metal immediately adjacent flows together and forms the weld. At the end of the seam the half nuts 41 and 42 run on to an unthreaded portion 18' (see Fig. 8) of the lead screw thereby preventing the carriage 40 from damaging the mechanism in case an operator should fail to stop the motor 3 at the proper time. As soon as the two seams have been welded, the two radial arms of the clamping machine are swung away and two more arms bearing more material to be welded are positioned under the torch supporting members and the above described operation is repeated.

Thus I have provided automatic means for moving a welding torch longitudinally along and transversely across a seam to be welded. Furthermore, I have provided means for adjusting the speed of the travel, and the rapidity and amplitude of the torch vibrations so that metal of various thicknesses may be properly welded by my device. Moreover, I have provided numerous adjustable features, supplementary to the broad features, which are desirable to produce an efficient machine. While I have described in detail the embodiment of my invention it may be utilized in other specific forms than the one shown.

Having now fully described my invention, what I claim is:

1. In a machine of the class described, a welding torch, automatic means to move said torch along a seam to be welded, and automatic means to vibrate said torch in a straight line in another direction.

2. A welding apparatus, comprising in combination, a welding torch, means to move said torch longitudinally along a seam to be welded and means to move said torch rapidly in a straight line in a direction transverse to said seam.

3. A welding apparatus, comprising in combination, a torch, means to move said torch longitudinally along a seam to be welded, means to move said torch rapidly transverse to the seam, means to vary the rapidity of the transverse movements.

4. In a welding apparatus, the combination with a welding torch, of means to move said torch along a seam to be welded, means to move said torch in a straight line in a transverse direction and means to vary the length of the transverse movements.

5. In a welding apparatus, the combination with a welding torch of means to move said torch along a seam to be welded means to vibrate said torch rapidly in a transverse direction, means to vary the rapidity of said transverse vibrations and means to vary the amplitude of said vibrations.

6. In a welding apparatus, the combination of supporting means provided with ways, of a carriage movable in said ways, a welding torch supported on said carriage, means to move the carriage along the ways, means to vibrate said torch in said support, and means to vary the amplitude and rapidity of the vibrations of said torch.

7. In a welding apparatus, the combination of means for carrying a heating element adjacent the parts to be welded, mechanism to move said means together with a speed varying device therefor, said device constructed and arranged to vary the speed gradually and uniformly from zero to a definite maximum.

8. In a welding apparatus, the combination of means for carrying a heating element adjacent the parts to be welded mechanism to move said means, a speed varying device therefor, and means to move the heating element in a straight line at an angle to the movement given by said mechanism.

9. In a welding apparatus, the combination of means to support work to be welded, a heating element adapted to apply the heat necessary for the welding operation together with means to move the said first mentioned means and said heating element one relatively to the other and a speed varying device adapted to vary the speed of said relative movement gradually and uniformly from zero to a definite maximum.

10. In a welding apparatus, the combination of supporting means provided with a trackway, a carriage movable in said trackway, a welding torch supported on said carriage, automatic means to move the carriage along the trackway together with mechanism operable to swing the trackway on its supporting means into various vertical planes to adjust the travel of the carriage in line with the work to be welded, all constructed and arranged so that the torch will be moved along the trackway in proper line to perform the welding operation.

11. In a welding apparatus, the combination of a torch, means to carry the torch, mechanism for moving said means in line with a seam to be welded including a speed varying device, a device to oscillate said torch across the seam during the welding operation having means to vary the amplitude of said cross movements, and means to vary the speed of said cross movements.

12. In a welding apparatus, torch carrying means, a support therefor, driving devices adjustable to the desired speed to move said means along its support, a torch together with devices for oscillating the torch with respect to the main direction of travel and devices to vary the rapidity and amplitude of the oscillating movement of the support.

13. In a welding apparatus, the combination of a main frame, two arms connected therewith and on each arm a torch carrying means, driving devices to move the torch carrying means along the arm, a welding torch, together with means to adjust each arm to line up the path of the torch with respect to the work to be welded.

14. In a welding apparatus, the combination of a main frame, means to form a trackway supported thereon, a carriage mounted in the trackway, a torch on the carriage, a lead screw parallel with the trackway engaging a thread on the carriage, means to drive the lead screw to move the carriage along the trackway, a portion of said lead screw being free of threads and of a diameter equal to that of the roots of the threads so that the carriage will stop automatically when it reaches said portion.

15. In a welding apparatus, the combination of a supporting arm, a carriage arranged to move along the arm, said carriage being provided with a movable torch supporting member and means to oscillate the torch supporting member in a straight line transversely of the arm.

16. An autogenous welding apparatus, comprising in combination a frame, a movable torch supporting member mounted therein, a torch arranged thereon to move at a distance from the frame, means to vibrate said torch, and means to deflect the heat from the torch away from the frame.

17. In combination in a seam welding apparatus, a device arranged to occupy a position at a desired point between the edges to be welded and prevent the edges overlapping in the welding operation, means to move said device as the seam is formed, a movable torch carrying means, a torch thereon, means to support the torch a desired distance at the rear of and above said device and driving devices connected to operate in unison for said device and torch carrying means whereby the seam may be formed by the torch and the edges to be joined properly positioned by said device.

18. In a seam welding apparatus, a central member provided with two outwardly extending arms, arranged to overhang work to be welded, means to support said member in spaced relation with the floor so as to leave an unobstructed path below said arms and member from the outer end of one arm to the outer end of the other arm, torch carrying devices constructed to travel on said arms, means to move said devices along the arms a given distance.

19. In a seam welding apparatus, a torch, devices to support, move, and adjust the torch for the welding operation, comprising adjustable means to line the torch travel to correspond with the seam to be welded, means to oscillate the torch across its main line of travel in a straight line during the welding operation and means to position the torch a desired distance from the metal in accordance with the work to be performed.

20. A seam welding apparatus, comprising, a central member, arms mounted on either side thereof and arranged to extend outwardly therefrom to overlie the work to be welded, means to support said member so as to leave the space therebelow unobstructed, a lead screw in each arm, means to simultaneously drive the lead screws, a trackway formed in each arm, a carriage in each trackway having a portion to engage the lead screw and a part depending from the trackway, and a welding torch carried by said part, all constructed and arranged so that the torches may be simultaneously moved in opposite directions above and along a seam to be welded.

21. A seam welding apparatus, comprising, a supporting member, an arm mounted thereon extending outwardly therefrom and arranged to overhang work to be welded, a lead screw in the arm, means to drive the latter, a trackway formed in the arm, a carriage constructed to roll in the trackway and arranged to be propelled by said lead screw, a portion of the carriage arranged to extend downwardly through and below the arm and a welding torch mounted on said portion and arranged to overlie the seam to be welded.

22. A seam welding apparatus, comprising a central member, opposed outwardly extending arms mounted thereon and arranged to overhang the work to be welded, a lead screw extending within said member, means therein to drive said screws at equal speed in opposite directions, a trackway formed in each arm, a carriage movable in the trackway, a welding torch on the carriage and depending therefrom, and releasable devices on the carriages to engage the lead screws.

HENDERSON G. DAVIS.

Witnesses:
HENRY A. BOOTH,
FRANKLIN G. NEAL.

Copies of this patent may be obtained for five cents each, by addressing the "Commissioner of Patents, Washington, D. C."